United States Patent Office 3,341,709
Patented Sept. 12, 1967

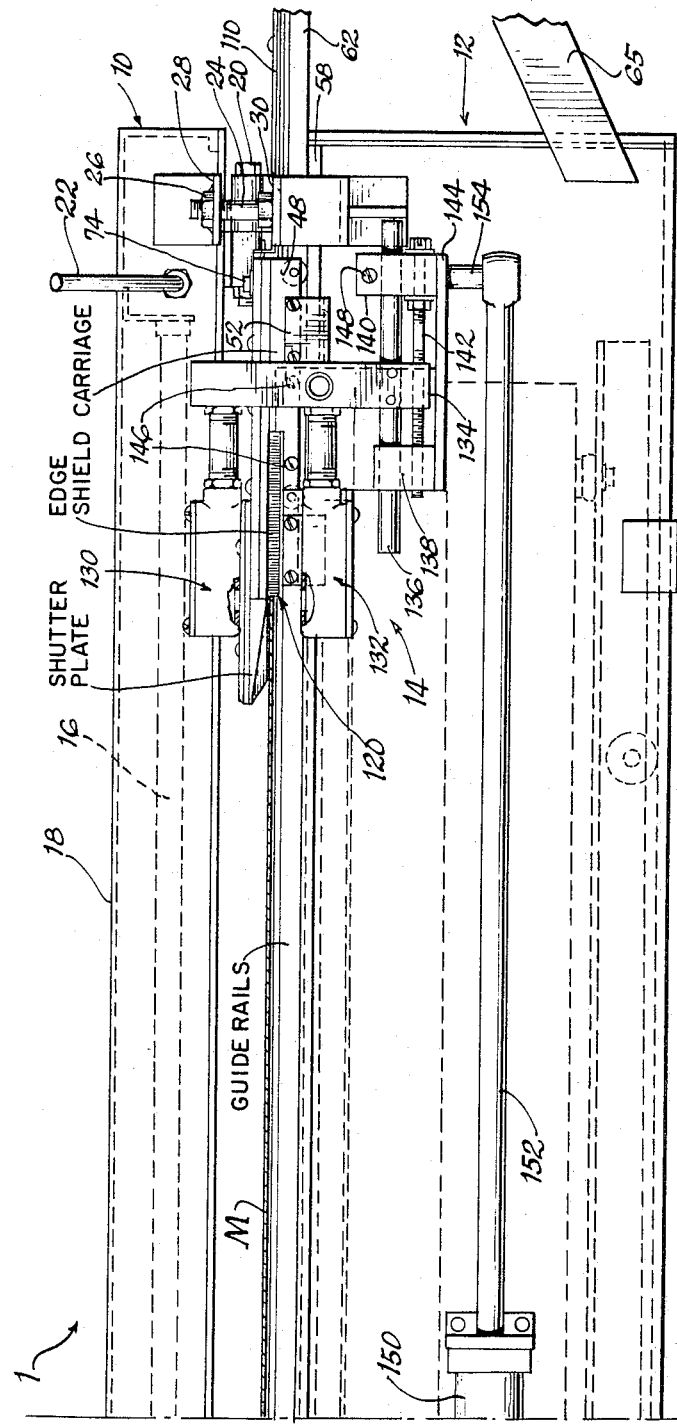

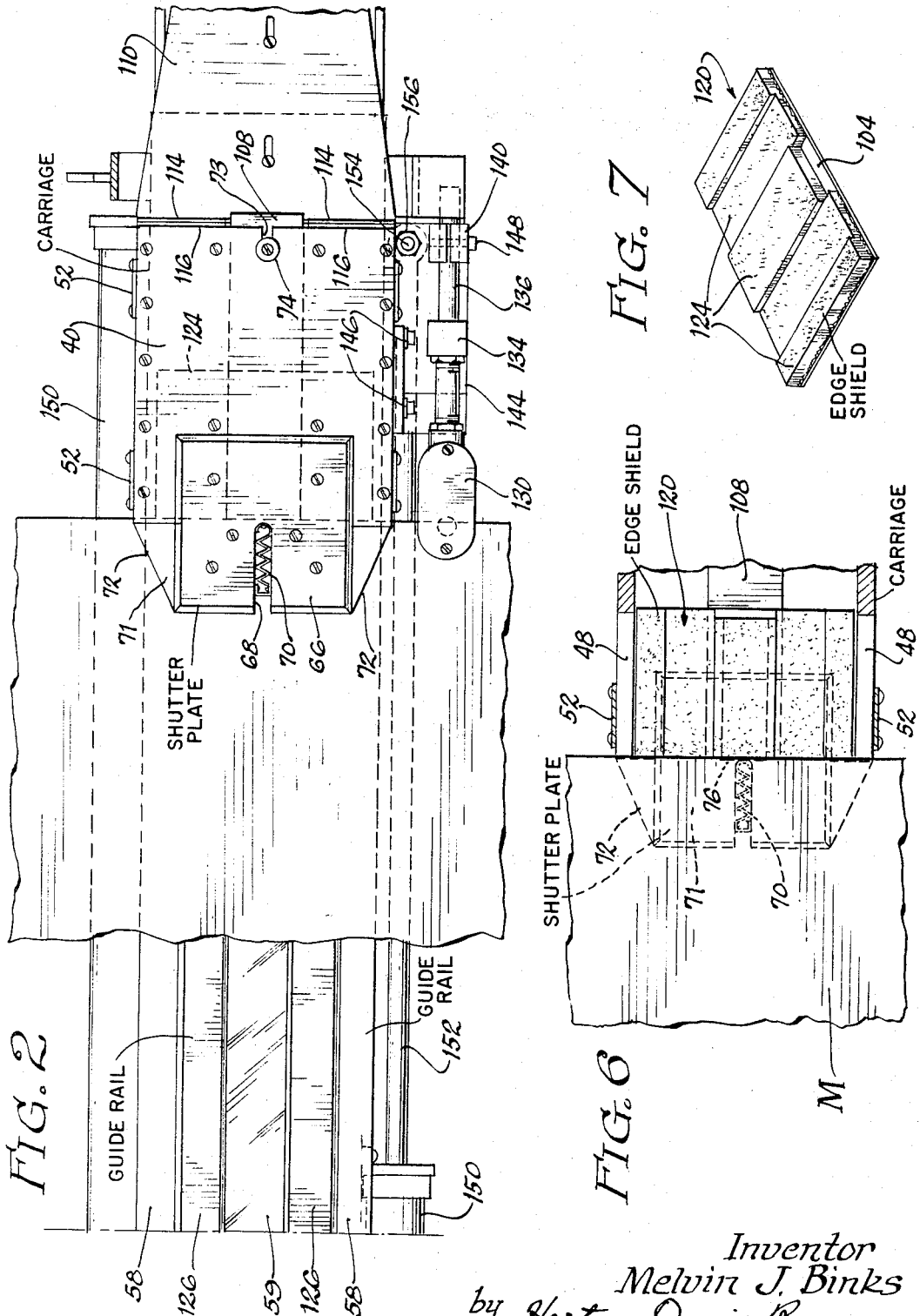

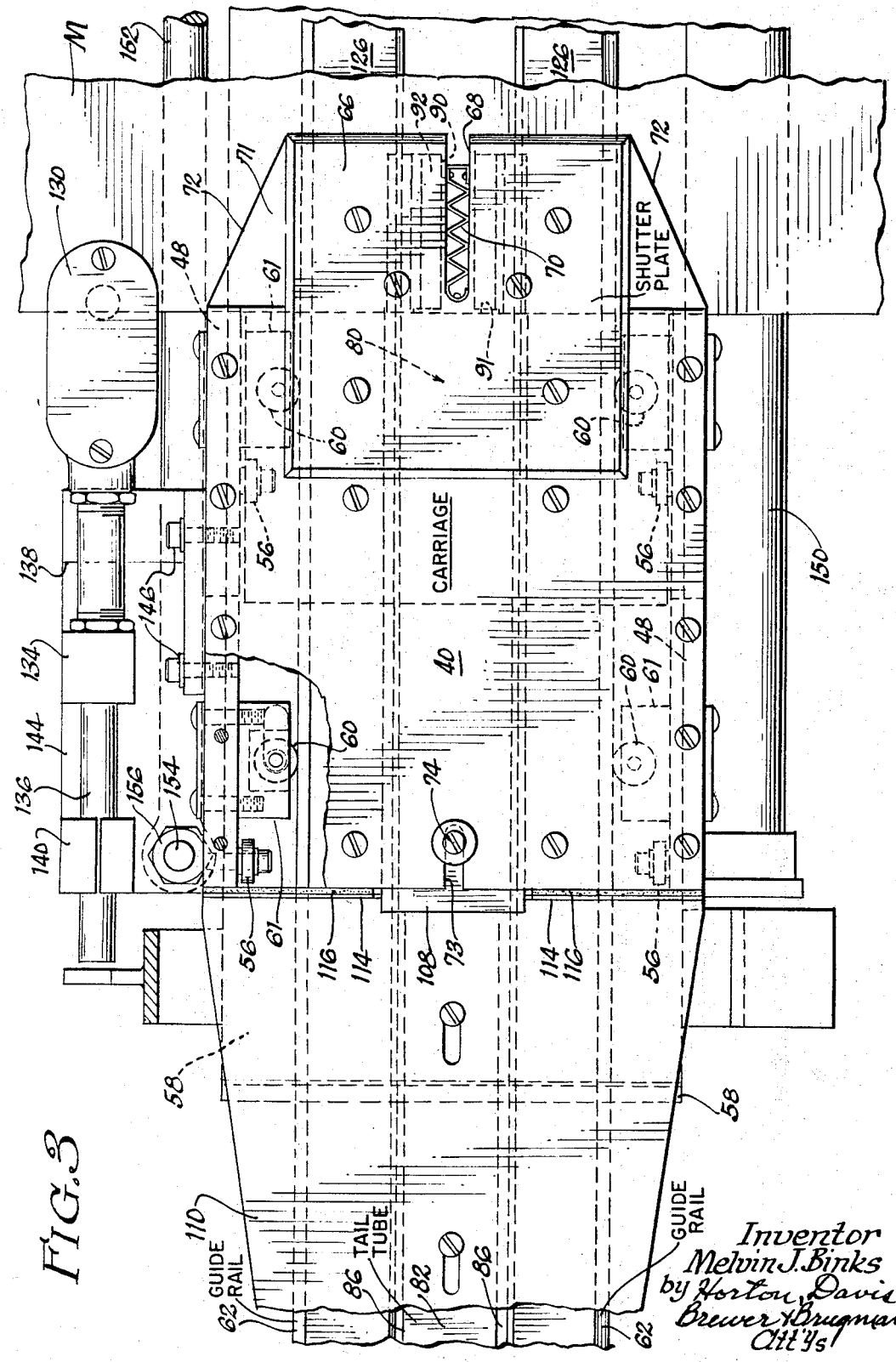

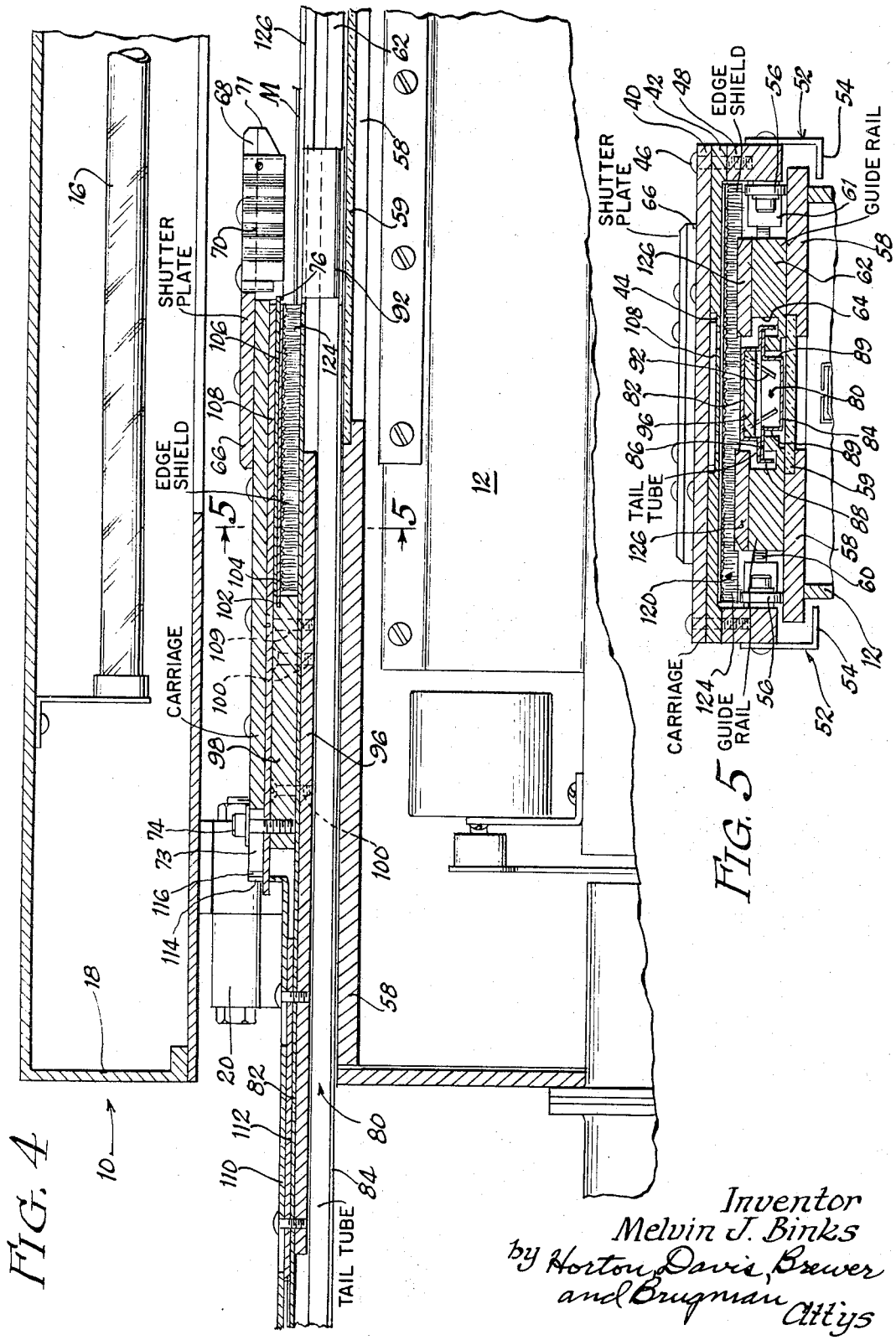

3,341,709
YIELDABLE AND RELEASABLE PIN HOLE DETECTOR EDGE LIGHT SHIELD ASSEMBLY
Melvin J. Binks, 4880 N. Marine,
Chicago, Ill. 60640
Filed July 21, 1964, Ser. No. 384,206
8 Claims. (Cl. 250—237)

ABSTRACT OF THE DISCLOSURE

An assembly admitting vertical light, yet preventing light transmittal around edges of sheet material traveling through a pin hole detector. Carriages, movable along guide rails to the sheet edges, have apertured shutter plates, each with a vertical light guide extending over the sheet edges. A hollow, elongated tail tube is releasably mounted, by a single bolt, under each carriage to provide a movable end shade. Each tail tube has side arms with downward flanges slidably received in grooves along the guide rails to form a light-tight multi-turn labyrinth. The hollow tail tube configuration provide spaced upper and lower walls having apertures extending under a sheet edge in spaced alignment along a vertical plane including a shutter vertical light guide to admit only vertical light therethrough. Fabric edge shields have vertical pile held against the sheet edges by clamping each between a tail tube and shutter plate, respectively. The free ends of the pile bear downward on the tail tube, preventing light transmittal around the sheet edges, yet yieldably allowing substantial sudden outward transverse movements of the sheet edges into the fabric pile.

---

This invention relates to improvements in light shields for pinhole detecting devices.

Pinhole detectors are widely used for inspecting continuous strip material such as electrolytically tinned tinplate. They generally are used to sense the presence of small imperfections such as pinholes and other flaws in the continuous strip in various phases of the processing of tinplate. Exemplary pinhole detecting devices are illustrated in U.S. Patent No. 2,395,181, issued February 19, 1946 to Joseph W. Hags and U.S. Patent No. 2,730,348, issued on January 10, 1956 to George H. Rendel.

At today's tinplate manufacturing speeds, frequently as high as five thousand or more feet per minute, and with today's requirement for sensitivity of inspection to holes of 1 mil or less, it is apparent that pinhole detecting devices must be precision equipment. What it is further understood that the tinplate weaves from side to side and pulses vertically somewhat it becomes clear that the problem of insulating the photosensitive means of the pinhole detecting device from unwanted light, both ambient light and light reflected from the pinhole detecting device light source means, is indeed a serious one.

It is with improved means for insulating the photosensitive means of pinhole detecting devices from unwanted light to prevent false signals, hence the false rejection of prime portions of a strip of tinplate that this invention is concerned.

To this end the present invention teaches an improved assembly which admits vertical light but prevents light transmittal around an edge of a sheet of material traveling a path between transversely extending light source and sensor of a pin hole detector. A pair of spaced guide rails are mounted on the detector at a level beneath the path of the sheet material and over the light sensor. The rails define transverse borders of a sensor window and have grooves along the borders. A carriage is movable along the rails to and from the sheet edge and has means to continuously position it there. A shutter plate is affixed on top of the carriage to extend outward therefrom beyond and over the edge of the sheet material. An elongated aperture through the shutter has a zig-zag light guide with vertical walls that encourage the transmittal of only vertical light. A hollow elongated tail tube is releasably mounted, by a single bolt, under each carriage to provide a movable end shade for the sensor window. Each of the tail tubes is at a level below the sheet material and between the rails. One end of the tube is enclosed and light-tight, while the other end is open and extending under and beyond the sheet edge. The tubular configuration includes outward side arms with downward flanges which are slidably received in the rail grooves to form a multi-turn labyrinth blocking light transmittal between the tube and rails. The tubular configuration is lightweight and provides vertically spaced upper and lower walls with elongated apertures at the open end. The apertures are aligned and spaced along a vertical plane including a shutter aperture, in this manner admitting only vertical light. Fabric edge shields have vertical pile held against sheet edges by clamping a shield between each tail tube and shutter plate, respectively. The fabric pile reaches from the sheet edge a substantial distance transversely outward and extends above and below the sheet material. The free ends of the pile rest upon the upper walls of the tube and are free to yield to sudden transverse movement of the sheet of material, yet prevent light transmittal around the sheet edge. The inspection and replacement of an edge shield, which is most susceptible to wear, is quickly and easily accomplished by removal of the single fastener to release the tail tube and unclamp the edge shield.

It is, therefore, an object of this invention to provide improved means for preventing the introduction of unwanted light into the photosensitive device of a pinhole detector.

It is a further object of this invention to provide novel light shielding means for pinhole detecting devices in which light is used to sense the presence of flaws in material to be inspected thereby, whereby the false indication of holes and other flaws is reduced to a minimum.

Yet another object of this invention is to provide novel means for locating light shielding components of a pinhole detector with respect to the edge of a moving strip of material.

Still other objects and advantages of this invention will become apparent from the following description and drawings of which:

FIG. 1A is a side elevation of portions of the right hand side of the pinhole detecting device of FIG. 1;

FIG. 2 is a partial plan view of FIG. 1A;

FIG. 3 is an enlarged plan view of a portion of FIG. 2;

FIG. 4 is an enlarged view partially in section of a portion of FIG. 1;

FIG. 5 is an end sectional view taken substantially along line 5—5 of FIG. 4;

FIG. 6 is a bottom view of a portion of the light shielding assembly of FIG. 2; and FIG. 7 is a bottom perspective view of a light barrier assembly component.

Figure 1:
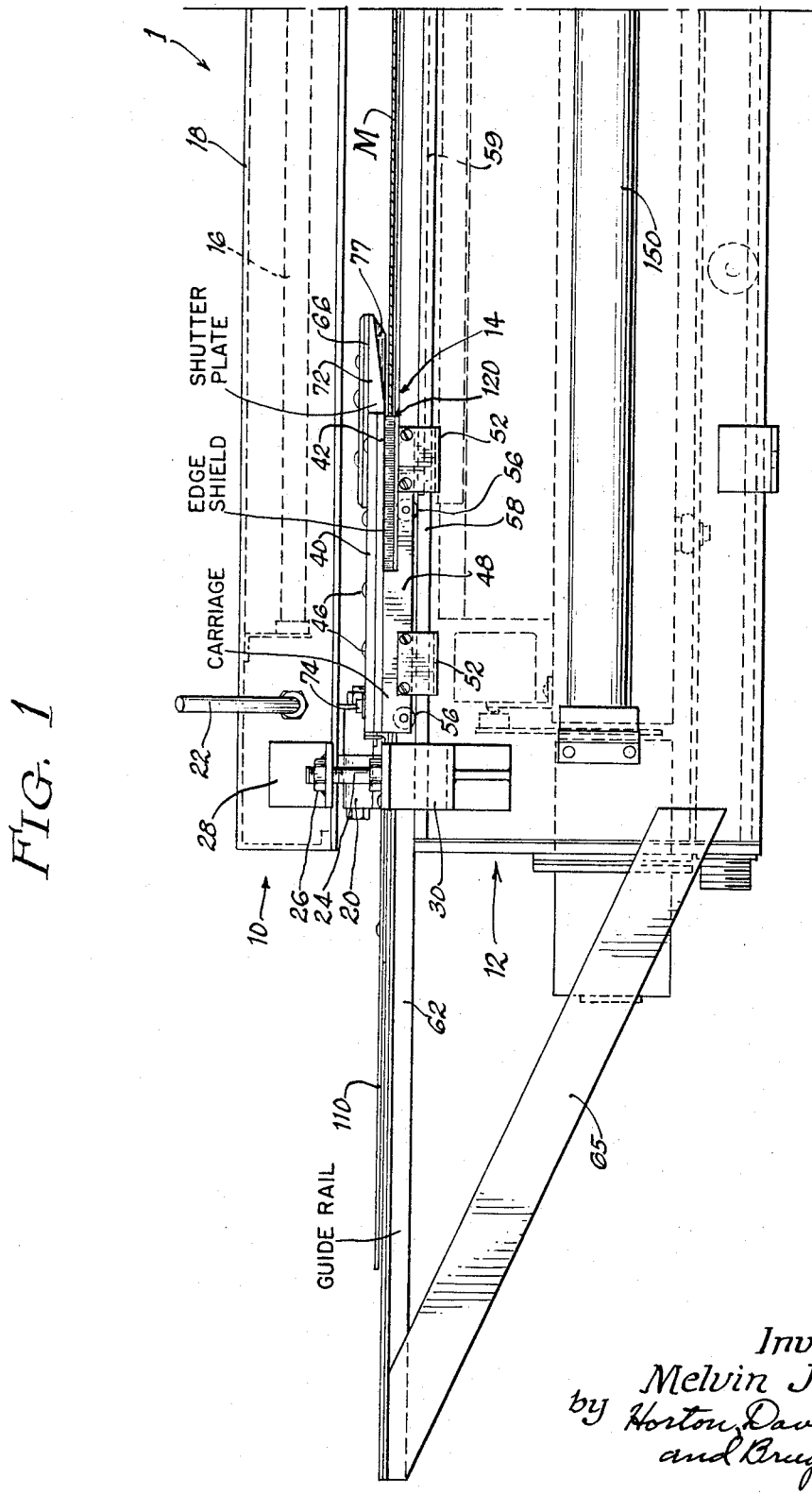
FIGURE 1 is a side elevation of portions of the left hand side of a pinhole detecting device embodying the improvements of this invention viewed from the direction in which the sheet to be inspected approaches.

Referring first to FIGS. 1 and 1A, those drawings illustrate a pinhole detecting device comprising a preferred embodiment of this invention. They represent, respectively, the left and right hand halves of a pinhole detector viewed from the front, that is from the direction from which the traveling sheet M of material to be inspected approaches the pinhole detecting device. The pinhole detecting device is elongated and extends transversely of the path of the traveling strip.

The pinhole detecting device 1 is proportioned to accommodate varying widths of metal sheets M within a predetermined range such as from 6 inches to 54 inches in width. The sheet M follows a path which carries it between transversely aligned light source 10 and photosensitive device chamber 12 supported on a mounting frame (not shown). The chamber 12 has one or more photosensitive devices associated therewith in a manner known in the art. At each edge of the sheet M of metal a light shield assembly is indicated generally by the numeral 14.

The light source 10 includes a suitable light producing source such as fluorescent tubes 16. Tubes 16 are mounted in a housing 18 which is hingedly connected to the photosensitive device chamber 12 by hinges 20. Handles 22 are connected to housing 18 at each side thereof to facilitate pivotal movement of housing 18 with respect to chamber 12 thereby to gain access to the light shield assembly 14 and other portions of the pinhole detecting device.

At the handle side of housing 18 adjustable light source leveling pins 24 are provided. The heads of pins 24 are movable vertically (as seen in FIGS. 1 and 1A) as a result of their threaded engagement with nuts 26 which are fixedly mounted as by welding on flanged plates 28 connected to housing 18. Those pins serve to level housing 18, hence light source 10 with respect to the photosensitive device chamber 12 to which leveling plates 30 are connected.

Each of the light shield assemblies 14 of one embodiment of this invention includes a carriage having a generally rectangular main plate 40 (see FIG. 5). To the underside of each carriage main plate 40 a pair of guide strips 42 having longitudinally opposed shelf edges 44 are attached as by bolts 46 which also serve to secure carriage frame bars 48 to carriage main plate 40.

Generally L-shaped retainer clips 52 having inwardly extending arms 54 are secured as with bolts to carriage frame bars 48. These limit the vertical extent to which the light shield assemblies 14 may be lifted or raised (see FIG. 5) above the photosensitive device chamber 12.

Each of the light shield assembly carriages is mounted on a plurality of guide rollers, some of which roll on vertical axes, others of which roll on horizontal axes. For example, each carriage has four guide rollers 56, two on each side of the carriage main plate 40, rotatably connected to carriage frame bars 48 by horizontal stub axles and rollingly supported on the top plate 58 of the photosensitive device chamber 12. The top plate 58 extends the entire length of the pinhole detector photosensitive device chamber. Over the photosensitive device plate 58 has an opening defining a transversely elongated window bordered by ledges, upon which is supported a transparent glass shielding plate 59, as shown in FIG. 5.

Similarly four guide rollers 60, two on each side of each carriage main plate 40, are rotatably connected as by vertical stub axles to mounting blocks 61 connected to carriage frame bars 48 to rollingly engage the sides of horizontal guide roller rails 62. As seen in cross-section of FIG. 5, guide roller rails 62 define elongated transversely extending grooves 64 (transversely of the path of the sheet M) which are adapted to cooperate with a tail tube, described hereafter to minimize unwanted passage of light into the photosensitive device chamber. Again with reference to the cross-section of FIG. 5, it is noted that the rails 62 overlie the ledges of top plate 58 to lock in the glass plate 59. Also, it is apparent that rails 62 overhang the glass plate 59 to define the longitudinal borders of a window to the chamber 12. The grooves 64 run immediately along the aforesaid borders. Rails 62 are supported at their ends, as are the other components which extend to the ends of device 1 by suitable means such as struts 65. Horizontal guide roller rails 62 are rigidly connected to the top plate 58 of the photosensitive device chamber 12 as by bolting. The rails 62, top plate 58 and carriage rollers are proportioned and spaced so that there is substantially no play or cant in the carriage, or, in other words, the carriage can move substantially only transversely of the path of the traveling sheet M.

To each carriage main plate 40 a shutter plate 66 is connected as by bolting. The forward end of the shutter plate extends forwardly of the forwardmost edge of carriage main plate 40 defining at its forward end an elongated transverse shutter aperture 68. Apertures 68 straddle the centerline of the aligned transverse centers of the light source 10 and photosensitive device chamber 12 so that if light passes through the aperture 68 from the light source it will actuate the photosensitive device associated with the photosensitive device chamber. In the shutter aperture 68, a zig-zag light guide 70 is mounted to limit light passing through the aperture 68 into the photosensitive device chamber 12 to that light which is substantially normal to the major plane of the shutter plate 66. The shutter plate 66 includes a lower apertured lip plate 71 chamfered as seen in FIGS. 1 and 1A and having rearwardly inclined edges 72 (see FIGS. 2 and 3). The carriage includes a main plate locking slot 73 by which a light barrier assembly to be described is releasably connectable as by a locking bolt 74. At its rearward end lip plate 71 defines a notch 76, as seen best in FIG. 4, for a purpose to be described.

The light barrier assembly includes an elongated tail tube 80 having an upper elongated inverted U-shaped member 82 and a lower elongated U-shaped member 84 defining an enclosed hollow channel therebetween. These members are joined as by welding or brazing to define that hollow elongated channel. Together members 82 and 84 define at each side an elongated horizontal arm 86 having at its outermost edge an elongated downwardly extending flange 88. Arms 86 and flanges 88 together with the respective arms 89 of the U-shaped member 82, define an inverted U or J-shaped transversely extending channel which cooperates with the guide roller rail groove 64 to define, in cross section, a labyrinth having a plurality of turns, which substantially eliminates one source of normal light leakage confronted in pinhole detectors.

At its innermost end, directly beneath shutter aperture 68 of the shutter plate 66, the tail tube defines a transverse tail tube aperture 90 (shown by dashed line in FIG. 3) in the lower member 84. This aperture, as seen in FIG. 3, is in line with the shutter aperture 68, hence with the centerlines of the light source and photosensitive device chamber. The aperture 90, for each tail tube 80, is provided by removing a generally rectangular segment of U-shaped member 84 at its innermost end. Directly above the inverted U-shaped member 82 is slit at its innermost end and along its longitudinal center, a length approximately equal to the length of the segment removed from member 84. Another slit 91 is made normal to the rearward end of the first slit so that rather than removing the portion of the inverted U-shaped member 82, those segments 92 there formed, may be bent downwardly at angles of approximately sixty degrees. As visualized best by reference to FIG. 4, the edge of traveling strip M passes between shutter plate 66 and the inward end of tail tube 80, directly over the segments 92. Thus, inclined tail tube segments 92 serve to guide portions of the traveling sheet M which tend to enter downward toward the tail tube aperture 90, such as downwardly turned ends of sheets M at welds away from aperture 90 eliminating one source of stoppage at pinhole detectors experienced in tinning lines. The long edges of tail tube segments 92 are spaced to define a transverse gap aligned with and above the aperture 90 in lower member 84. It is readily apparent that the vertically aligned shutter aperture 68, light guide 70, gap between segments 92, and tail tube aperture 90, are spread apart over an appreciable vertical distance extended above and below the plane of sheet M. This assures that only vertical light can pass through pin holes in sheet M. Thus, extraneous light is effectively shielded out.

The hollow interior of the tail tube 80 is provided with an elongated transversely extending reinforcing plate 96 extending transversely of the path of the sheet M. It is through tail tube 80 to reinforcing plate 96 that other portions of the light barrier assembly are connected. The inside of the tail tubes 80 such as at the outward ends are plugged or filled with a sealing material (not shown) such as an elastomer to block light transmission therethrough.

The light barrier assembly also includes a vertical spacer plate 98 connected as by bolts 100 in reinforcing plate 96 to position tube 80 a desired interval below traveling sheet M. At its forward edge spacer plate 98 defines a retaining notch 102 (see FIG. 4). An edge shield mounting plate 104 is connected as by welding to a spacer plate 106 which spaces mounting plate 104 from light barrier support plate 108. Plate 108 is connected, as by bolts 109 to vertical spacer plate 98 and slidably received between carriage strips 42 on the opposed shelf edges 44. The rearward edge of mounting plate 104 is proportioned to be accommodated by retaining notch 102 in spacer plate 98 and the forward edge of spacer plate 106 is proportioned to be accommodated in retaining notch 76 of lip plate 71 (see FIG. 4). Notice in cross-section of FIG. 5 that plate 106 fits between carriage strips 42 to bear against the underside of support plate 108.

A generally trapezoidally shaped enlarged shield member 110 is connected at the rear of carriage main plate 40 on tail tube 80 as by bolts into reinforcing plate 96 through a further spacer plate 112. A segmental upstanding flange 114 (see FIG. 2) abuts the rearward end of main plate 40 through the intermediary of a segmental seal gasket 116. When assembled the rearward end of support plate 108 extends rearwardly between the segments of upstanding flange 114 serving to provide a light insulating structure along the entire rearwardmost edge of carriage main plate 40 (see FIGS. 3 and 4). Support plate 108 is provided with an aperture through which locking bolt 74 passes.

When the light barrier assembly comprising the tail tube 80, reinforcing plate 96, spacer plate 98, shield member 110, spacer plate 112 and edge shield 120, is assembled together, it forms a single unitary member which is releasably connectable to the carriage by locking bolt 74. The end of bolt 74 is threadedly received in a threaded opening in vertical spacer plate 98. Simply by loosening bolt 74, the entire light barrier assembly may be disengaged from the carriage and be removed by withdrawing it longitudinally of its axis (transversely of the path of sheet M). Since an edge shield 120 is connected to mounting plate 104 it is both simple and safe to remove an edge shield 120 for replacement or inspection, that is by removal of the bolt 74 to separate the carrier from light barrier assembly 14. As best visualized by reference to FIG. 4, then main carrier plate 40 with shutter plate 66 may be moved to the right, while the barrier assembly is moved to the left. Support plate 108 moves along with the light barrier assembly 14 by sliding within carrier strips 42 on the opposed shelves 44. This separation will move lip plates 71 with their notches 76 out of engagement with spacer plate 106. Mounting plate 104 is then free to be removed from engagement with notch 102 in the spacer plate 98, to thereby free the entire edge shield 120. It is evident that the downtime required for removal and replacement of edge shield 120 is but a few seconds. Heretofore the inspection of the interior portions of light shield assemblies required many minutes. Since the sheets M are frequently running at rates far in excess of a thousand feet a minute it is clear that the minimal downtime is highly advantageous and an exceedingly desirable result.

The edge shield 120 of this embodiment of my invention is a soft nylon pile fabric having a black fabric backing adhered to the mounting plate 104 and a soft downwardly extending black pile 124. The pile 124 bears against the tops of wear strips 126 and tail tube 80, to prevent transmission of light thereat around the edge of sheet M. As seen in FIGS. 5, 6 and 7 the pile may be shortened where it confronts the transversely extending wear strips 126 mounted as with bolts on the photosensitive device chamber across which the sheet M travels. The wear strips 126 are aligned and affixed on top of the roller guide rail 62, and, as can be seen in cross-section of FIG. 5, overlie the grooves 64. This provides another light blocking turn in the labyrinth defined by the tail tube arms 86, 89 and flanges 88, within the grooves 64 of the guide roller rails 62. The edge shield 120, the light barrier assembly of which it is a part and the carriage are proportioned so that the edge of the sheet M contacts the outermost fibers of the pile 124. In practice, pile extends transversely inwardly from the edge of the metal sheet M about five inches thereby providing a yielding light shield about five inches deep. Therefore where transverse edges of sheets M are welded unevenly or where for any other reason momentarily a portion of sheets M moves inwardly of the light shield assembly 14 it will do no damage to it. At the present time, light shielding assemblies using light absorbing or blocking means such as paint brushes and metal wear blocks are frequently seriously damaged when an uneven weld or other imperfection reaches the light shield assembly unnoticed and contacts it before it can be withdrawn by an edge locating means. Even more a problem when imperfections such as uneven welds reach the light shield assembly is the danger of breaking the sheet M requiring the line to stop for many minutes, a very expensive procedure. The yielding edge shield 120 provided in accordance with this invention minimizes such occurrences.

As mentioned the edge shield 120 is about five inches deep and approximately one-half inch in height between the mounting plate 104 and the uppermost surface of inverted U-shaped member 82 is provided. By means of the light barrier construction described extraneous light is substantially completely absorbed and blocked, thereby insulating the photosensitive device chamber from that frequently encountered source of extraneous light.

To enable the light shield assembly 14 to be responsive to the weave (transverse movement) of the sheet M and so that the sheet M may abut the edges of the edge shield 120, a photosensing means is located in advance of the approach of the sheet M to the carriage. It includes a light source 130 and a photocell means 132 calibrated to be responsive to increases and decreases in light intensity to which the photocell means 132 is exposed. These are mounted on a vertically extending bar 134. Bar 134 is connected to horizontal rod 136 which is slidably received by a supporting block 138 and a split locking block 140.

To accurately locate the light shield assembly 14 rotatable adjusting means are provided. To that end at its lowermost end bar 134 is provided with a threaded opening in which is received an adjusting screw 142. Adjusting screw 142, when rotated moves bar 134, hence the photocell means 132 and the aligned light source 130, transversely of the path of the sheet M within a limited range. Since supporting block 138 and split locking block 140 are fixedly connected to a mounting flange 144 fixedly connected as by bolts 146 to carriage frame bar 48, the movement of the photosensing means will vary its transverse relationship to the carriage thereby accurately positioning the photosensing locating means, hence the edge shield 120 with respect to the sheet M edge. When properly adjusted, split locking block 140 is clamped by clamping bolt 148 against the surrounded portion of rod 136.

A conventional hydraulic system is used to move the carriage in response to the weave in the sheet M sensed by the photosensitive locating means. To that end a hydraulic cylinder 150 with an extended piston rod 152 is provided for each carriage. The cylinder itself is connected to the photosensitive device housing while the exterior end of the extended piston rod is connected by a shaft 154 having a threaded end to mounting flange 144 by a nut 156.

The piston rod is responsive to an output of the photosensitive locating means, in a manner well understood in the art, thereby moving the carriage in response to weave of the sheet M. In this manner the edge of the sheet M is continuously sensed to keep the edge shield 120 properly positioned with respect to the edge of the sheet M. As a result inspection of the strip to almost its very edge is possible, something not achievable with other conventionally used light absorbing means in pinhole detector light shields.

But one light shield assembly and associated means has been described. It is intended that both light shield assemblies may be substantially identical.

While one embodiment of the pinhole detector light shield assembly of this invention has been described in detail it is clear that modifications and changes may be made therein consistent with the invention described and claimed herein.

I claim:

1. In a pinhole detector for a sheet of material traveling a path between transversely extending light source and sensor thereof, an improved assembly to prevent light transmittal around an edge of said material, comprising in combination therewith: a pair of spaced guide rails mounted on said detector at a level beneath said path and over said sensor, said rails defining transverse borders of a sensor window and having vertical grooves along said borders; a carriage riding along said rails for transverse guided travel to and from said edge; means to continuously position said carriage at said edge; a shutter plate affixed on top of said carriage to extend outward therefrom beyond said edge over said path, said shutter plate having an elongated aperture therethrough; a hollow elongated tail tube pending from under said carriage, below said path and between said rails to provide a movable end shade for said window, said tube having an enclosed light-tight end and an open end extending beyond said edge under said path, and including outward side arms with downward flanges received in said grooves to form a multi-turn labyrinth blocking light transmittal between said tube and rails, and said tube having vertically spaced upper and lower walls with elongated apertures therethrough at said open end, said shutter aperture and apertures aligned and spaced along a vertical plane, thereby admitting transmittal of only vertical light therethrough; and an edge shield hung from under said carriage to reach from said edge a substantial distance transversely outward therefrom, said shield of a vertical pile fabric extending above and below said path and bearing against said edge, said pile having free ends resting on an upper of said walls of said tube to prevent light transmittal around said edge, yet allowing sudden outward transverse movements of said sheet of material into said shield.

2. The improved assembly of claim 1 including a zigzag light guide in said shutter aperture, said light guide having vertical walls encouraging the transmittal of only vertical light.

3. The improved assembly of claim 2, including transverse wear strips on said rails to support said traveling sheet of material at said path, said wear strips overlying said grooves and said outward side arms of said tube to provide additional turns in said labyrinth blocking light transmittal therethrough.

4. The improved assembly of claim 3, wherein said apertures at said open end of said tube are a narrow elongated aperture in said lower of said walls, and a gap between downwardly inclined segments slit out of said upper of said walls, and wherein said free ends of said pile also rest on said wear strips to block outward transmittal of light therealong.

5. The improved assembly of claim 4, wherein said tail tube and edge shield are releasably mounted to said carriage by a single fastener means to facilitate inspection and replacement of said assembly.

6. The improved assembly of claim 5, wherein said fastener means is a single threaded bolt passing through said carriage to hold said tail tube, said edge shield being clamped between said tail tube and shutter plate.

7. The improved assembly of claim 6, wherein said tail tube includes a spacer plate affixed on said upper of said walls, said spacer plate having a threaded bore and a front surface positioned transversely outward from said apertures sufficient to accommodate said edge shield therebetween, said front surface having a notch therein, said shutter plate also having, with respect to said front surface, an opposed surface with a notch therein, and said edge shield having mounting means engaged in said notch of said front surface and said opposed surface, respectively, thereby clamping said edge shield therebetween whenever said bolt is engaged in said bore to mount said tail tube to said carriage.

8. The improved assembly of claim 7, wherein said carriage has an undersurface with a channel therealong, said channel including undercut opposed shelves, and said tail tube has a support plate therefor slidably received within said channel on said shelves.

References Cited

UNITED STATES PATENTS

| 2,820,908 | 1/1958 | Linderman | 250—239 X |
| 2,886,716 | 5/1959 | Camp | 250—219 |
| 3,125,682 | 3/1963 | Linderman et al. | 250—219 |
| 3,240,945 | 3/1966 | Dixon | 88—14 |
| 3,255,356 | 6/1966 | Brosious et al. | 250—219 |
| 3,263,086 | 7/1966 | Brosious et al. | 250—219 |

OTHER REFERENCES

General Electric, New Pinhole Detector, received in Scientific Library June 1957, 4 pages.

RALPH G. NILSON, *Primary Examiner.*

J. D. WALL, *Assistant Examiner.*